United States Patent
Taherzadeh Boroujeni et al.

(10) Patent No.: US 11,683,711 B2
(45) Date of Patent: Jun. 20, 2023

(54) MEASUREMENT REPORT WITH NESTED INDEXING

(71) Applicant: QUALCOMM Incorporated, San Diego, CA (US)

(72) Inventors: Mahmoud Taherzadeh Boroujeni, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 17/313,909

(22) Filed: May 6, 2021

(65) Prior Publication Data

US 2022/0361026 A1    Nov. 10, 2022

(51) Int. Cl.
*H04W 24/10* (2009.01)
*H04W 76/11* (2018.01)
*H04B 7/06* (2006.01)
*H04L 5/00* (2006.01)
*H04W 16/28* (2009.01)
*H04W 56/00* (2009.01)

(52) U.S. Cl.
CPC .......... *H04W 24/10* (2013.01); *H04B 7/0626* (2013.01); *H04L 5/005* (2013.01); *H04W 16/28* (2013.01); *H04W 56/001* (2013.01); *H04W 76/11* (2018.02)

(58) Field of Classification Search
CPC ... H04W 24/10; H04W 16/28; H04W 56/001; H04W 76/11; H04B 7/0626; H04L 5/005
See application file for complete search history.

(56) References Cited

U.S. PATENT DOCUMENTS

| | | | |
|---|---|---|---|
| 2018/0255472 A1* | 9/2018 | Chendamarai Kannan | ................. H04W 76/10 |
| 2019/0215125 A1* | 7/2019 | Da Silva ................ | H04L 5/0051 |
| 2020/0280416 A1* | 9/2020 | Gao ....................... | H04L 5/0048 |

(Continued)

FOREIGN PATENT DOCUMENTS

WO    WO-2022149064 A1 *    7/2022

OTHER PUBLICATIONS

International Search Report and Written Opinion—PCT/US2022/072003—ISA/EPO—dated Aug. 2, 2022.

(Continued)

*Primary Examiner* — Deepa Belur
(74) *Attorney, Agent, or Firm* — Holland & Hart LLP

(57) ABSTRACT

Methods, systems, and devices for wireless communications are described. A user equipment (UE) may receive one or more reference signals from multiple cells and may perform measurements of the reference signals. The UE may transmit, based on the measurements, a measurement report associated with a first cell and a second cell of the multiple cells, where the measurement report includes at least a first field that indicates a first identifier corresponding to the first cell and a second field that indicates a second identifier corresponding to the second cell. The measurement report may further include a resource indicator for a first reference signal of the one or more reference signals and a second resource indicator for a second reference signal of the one or more reference signals, where the first resource indicator is associated with the first identifier and the second resource indicator is associated with the second identifier.

30 Claims, 10 Drawing Sheets

(56) References Cited

U.S. PATENT DOCUMENTS

2022/0216904 A1* 7/2022 Zhu .................. H04B 7/0626
2022/0263558 A1* 8/2022 Zhu .................. H04B 17/336

OTHER PUBLICATIONS

Nokia., et al., "Enhancements on Multi-Beam Operation", 3GPP TSG RAN WG1 #104-Bis-e, 3GPP Draft, R1-2103365, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021, 36 Pages, XP051993390, URL: https://ftp.3gpp.org/tsg_ran/WG1_RL1/TSGR1_104b-e/Docs/R1-2103365.zip.

* cited by examiner

MEASUREMENT REPORT WITH NESTED INDEXING

FIELD OF TECHNOLOGY

The following relates to wireless communications, including measurement report with nested indexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a serving base station via a serving cell and with additional base stations via neighboring cells. The UE may receive reference signals over multiple beams associated with the serving cell and the neighboring cells, and may measure the reference signals for use in channel state information (CSI) reporting. The UE may generate a cell-specific CSI report for each cell based on the measurements associated with the respective reference signals, which may result in increased complexity or overhead at the UE.

SUMMARY

The described techniques relate to improved methods, systems, devices, and apparatuses that support measurement report with nested indexing. Generally, the described techniques enable a user equipment (UE) to report measurements for multiple reference signals received over multiple beams of multiple cells in a single measurement report. For example, the UE may communicate with several cells and may perform beam refinement procedures to determine a beam for each cell (a preferred beam, a beam having a measurement above a threshold, etc.). As part of a beam refinement procedure, the UE may receive reference signals from each cell and may perform measurements on the reference signals. The UE may generate a measurement report that includes the measurements of at least some of the reference signals, e.g., for any of the multiple cells. The measurement report may further include cell identifiers indicating the cell with which the reported reference signals are associated and resource indicators for each of the reported reference signals. For instance, the UE may include, in the measurement report, a first field to indicate a first cell identifier for a first cell and a second field to indicate a second cell identifier fir a second cell, as well as a first resource indicator for a first reference signal and a second resource indicator for a second reference signal. The first reference signal may be associated with the first cell, and as such, the first resource indicator may be associated with the first cell identifier. In some examples, the second reference signal may be associated with the second cell, such that the second resource indicator may be associated with the second cell identifier. The UE may transmit the report to one or more base stations associated with one or more of the multiple cells.

A method for wireless communications at a UE is described. The method may include receiving a set of multiple reference signals from a set of multiple cells, performing a set of measurements of the set of multiple reference signals based on the receiving, and transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

An apparatus for wireless communications at a UE is described. The apparatus may include a processor, memory coupled with the processor, and instructions stored in the memory. The instructions may be executable by the processor to cause the apparatus to receive a set of multiple reference signals from a set of multiple cells, perform a set of measurements of the set of multiple reference signals based on the receiving, and transmit, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

Another apparatus for wireless communications at a UE is described. The apparatus may include means for receiving a set of multiple reference signals from a set of multiple cells, means for performing a set of measurements of the set of multiple reference signals based on the receiving, and means for transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

A non-transitory computer-readable medium storing code for wireless communications at a UE is described. The code may include instructions executable by a processor to receive a set of multiple reference signals from a set of multiple cells, perform a set of measurements of the set of multiple reference signals based on the receiving, and transmit, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

In some examples of the method, apparatuses, and non-transitory computer-readable medium described herein, transmitting the measurement report may include operations, features, means, or instructions for transmitting, in the measurement report, a first resource indicator for a first reference signal of the set of multiple reference signals and a second resource indicator for a second reference signal of the set of multiple reference signals, the first resource indicator associated with the first identifier corresponding to the first cell and the second resource indicator associated with the second identifier corresponding to the second cell.

In some examples of the method, apparatuses, and non-transitory computer-readable medium described herein, transmitting the measurement report may include operations, features, means, or instructions for transmitting, in the measurement report, a first signal measurement associated with the first resource indicator and a second signal measurement associated with the second resource indicator, where the first resource indicator and the first reference signal correspond to a first beam of the first cell, and the second resource indicator and the second reference signal correspond to a second beam of the second cell.

In some examples of the method, apparatuses, and non-transitory computer-readable medium described herein, transmitting the measurement report may include operations, features, means, or instructions for transmitting, in the measurement report, a third signal measurement associated with a third resource indicator and a fourth signal measurement associated with a fourth resource indicator, where the third resource indicator corresponds to the first cell and the fourth resource indicator corresponds to the second cell.

In some examples of the method, apparatuses, and non-transitory computer-readable medium described herein, the second signal measurement includes a differential measurement relative to the first signal measurement and the first and second resource indicators include one of a channel state information resource indicator or a synchronization signal block resource indicator.

Some examples of the method, apparatuses, and non-transitory computer-readable medium described herein may further include operations, features, means, or instructions for receiving a message indicating one or more parameters for transmission of the measurement report, where the one or more parameters includes a number of signal measurements to include in the measurement report, a number of cells to include in the measurement report, a number of beams for each cell included in the measurement report, or any combination thereof.

In some examples of the method, apparatuses, and non-transitory computer-readable medium described herein, transmitting the measurement report may include operations, features, means, or instructions for transmitting the measurement report in accordance with the one or more parameters, where the measurement report includes the number of signaling measurements, the number of cells, and the number of beams for each cell.

In some examples of the method, apparatuses, and non-transitory computer-readable medium described herein, transmitting the measurement report may include operations, features, means, or instructions for transmitting a nested index measurement report, the nested index measurement report including an index common to one or more other fields in the measurement report.

In some examples of the method, apparatuses, and non-transitory computer-readable medium described herein, the index includes the first identifier, where the first field may be associated with the one or more other fields in the measurement report.

In some examples of the method, apparatuses, and non-transitory computer-readable medium described herein, performing the set of measurements of the set of multiple reference signals may include operations, features, means, or instructions for measuring one or more of a reference signal received power, a signal to noise ratio, a signal to interference plus noise ratio, a reference signal strength indicator, or any combination thereof for the set of multiple reference signals.

In some examples of the method, apparatuses, and non-transitory computer-readable medium described herein, the transmitting the measurement report may include operations, features, means, or instructions for transmitting a layer 1 (L1) measurement report, a channel state information report, or any combination thereof.

In some examples of the method, apparatuses, and non-transitory computer-readable medium described herein, the first identifier includes a first cell identifier associated with the first cell or a receive panel identifier associated with a first receive panel of the UE and the second identifier includes a second cell identifier associated with the second cell or a second receive panel identifier associated with a second receive panel of the UE.

DETAILED DESCRIPTION

Figure 1:
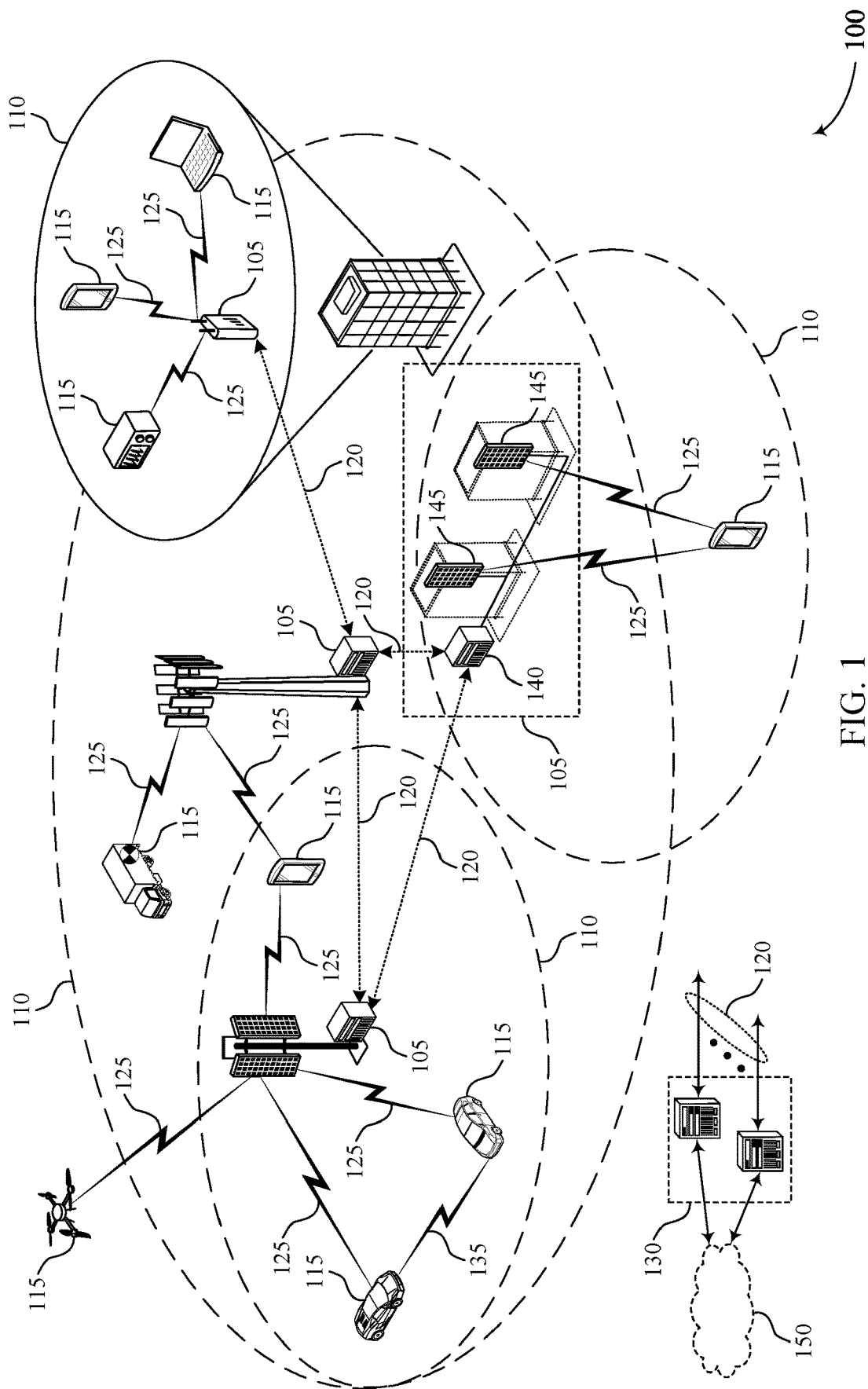
FIGS. 1 and 2 illustrate examples of wireless communications systems that support measurement report with nested indexing in accordance with aspects of the present disclosure.

In some wireless communications systems, a user equipment (UE) may communicate with multiple transmission reception points (TRPs), base stations, or other network nodes that may support communications via multiple cells. For example, the UE may communicate with a serving base station via a serving cell and one or more other base stations via one or more neighboring cells. Additionally, the UE may communicate with the base stations using multiple beams per cell. In such scenarios, the UE (and, in some cases, one or more of the base stations) may perform beam management or beam refinement procedures to determine a preference for a beam from the multiple beams, e.g., based on channel conditions. The UE may receive reference signals over multiple beams of each cell and may perform measurements on the reference signals. The UE may generate a report, such as a channel state information (CSI) report, to transmit to one or more of the base stations that includes measurement information for reference signals associated with a specific cell. That is, the CSI report may be cell-specific, where the measurement information may correspond to only one cell (e.g., despite the UE receiving and measuring reference signals from multiple cells).

However, as the number of cells with which the UE communicates increases, the overhead associated with reporting cell-specific CSI reports also increases. Additionally, the pool of available beams may also increase (e.g., as the number of cells increases), and the UE may have to report information for a greater number of beams, such that each cell-specific CSI report may use an increased amount of network resources and the CSI report itself may increase in bit size. In cases where the UE selects a beam from the pool of available beams or performs fast switching among the beams, such increased overhead and use of resources may increase latency and decrease efficiency for communications at the UE.

Accordingly, the techniques described herein support a UE generating a measurement report (e.g., a CSI report) that includes information for multiple beams associated with multiple cells. The measurement report may include, for example, measurements of reference signals received over the multiple beams, as well as information indicating which cell and beam each reported reference signal measurement is associated with. For example, the UE may include, in the measurement report, cell identifiers corresponding to respective cells and resource indicators corresponding to respective reference signals. The resource indicators may be associated with the cell identifiers, such that a resource indicator corresponds to a reference signal received over a beam of the cell indicated by the cell identifier.

In some examples, the UE may be configured with one or more parameters corresponding to information to be included in the measurement report, such as a number of measurements, a number of cells, or a number of beams for each cell, among other examples. Additionally, in some examples, the measurement report may be a nested index measurement report that includes an index common to one or more other fields in the measurement report. For example, the measurement report may include a cell identifier that is associated with a cell corresponding to two or more beams over which two or more reported reference signals are received. The UE may transmit the measurement report to one or more base stations, for instance, based on the one or more parameters.

Aspects of the disclosure are initially described in the context of wireless communications systems. Aspects of the disclosure are additionally described with reference to a measurement report format and a process flow. Aspects of the disclosure are further illustrated by and described with reference to apparatus diagrams, system diagrams, and flowcharts that relate to measurement report with nested indexing.

FIG. 1 illustrates an example of a wireless communications system 100 that supports measurement report with nested indexing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with one or more base stations 105 supporting communications via one or more cells. The UE 115 may perform beam selection (e.g., beam management or beam refinement procedures) to determine the preference for one or more beams to use, for example, based on channel conditions associated with each beam. To support beam selection, each base station 105 with which the UE 115 communicates may transmit one or more reference signals over one or more beams to the UE 115. The UE 115 may perform measurements on the reference signals and report the measurements to one or more of the base stations 105. For instance, the UE 115 may transmit a cell-specific CSI report (e.g., via L1 reporting) including measurements for reference signals associated with beams corresponding to the cell from which the beams were received. In some cases, the measurements may include a signal to interference plus noise ratio (SINR), a signal to noise ratio (SNR), a reference signal strength indicator, a reference signal received power (RSRP), or the like. In some cases, the measurements may be indicated in a report as differential measurements, for example, relative to another measurement.

However, in some examples, the UE 115 may be communicating with (e.g., may be served by) multiple cells at once, and transmitting a CSI report (e.g., a cell-specific CSI report) for each cell of the multiple cells may be inefficient and may increase overhead. Additionally, the UE 115 may communicate with each cell using multiple beams; if the UE 115 transmits a measurement report for each cell that includes measurement reports for each beam, the UE 115 may suffer increased latency and decreased efficiency as the number of cells and associated beams (e.g., and corresponding CSI reports) increases. For example, the UE 115 may operate using cell-free MIMO, where the UE 115 may be served by a number of different cells that each may be capable of communicating with the UE 115 using one or more beams. The UE 115 may perform beam selection for multiple beams of the multiple cells, which may include generating a CSI report for each cell and including, in the CSI report, beam information for each of the multiple beams. Generating and transmitting a CSI report for each cell may increase overhead and utilize an increased number of network resources, especially if the number of beams reported in each CSI report is large. Additionally, as the pool of available beams for the UE 115 gets larger, beam selection for the UE 115 may increase latency and complexity at the UE 115.

To support more efficient beam selection and, in some cases, fast switching among beams for the UE 115, the UE 115 may generate and transmit measurement reports (e.g., CSI reports) with nested indexing as described herein. For example, the UE 115 may generate a measurement report that includes measurement information for reference signals associated with beams of multiple cells, i.e., instead of a cell-specific measurement report including measurement information associated with beams of a single cell. Additionally, or alternatively, the measurement report may include indications of the cells that each reported reference signal (i.e., each reference signal measurement) corresponds to. In some examples, information common to multiple reported reference signals may be indicated once per report, e.g., instead of being indicated separately with each reported reference signal measurement. For example, the UE 115 may include, in the measurement report, cell identifiers corresponding to each respective cell and resource indicators (e.g., CSI resource indicators (CRIs), synchronization signal beam (SSB) resource indicators (SSBRIs)) corresponding to each respective reference signal. Each resource indicator may be associated with the cell identifier corresponding to the cell from which the reference signal (e.g., beam) was transmitted. For instance, if two or more reference signals correspond to beams associated with the same cell, the cell identifier for that cell may be transmitted once in the report (e.g., instead of once for each reference signal), and the resource indicators associated with the two or more reference signals may be indicated as associated with the cell identifier for that cell.

The UE 115 may transmit the generated measurement report(s) to one or more base stations 105. In some cases, the one or more base stations 105 may be associated with the multiple cells. Reporting measurement information for reference signals associated with multiple cells in a single report may enable the UE 115 to transmit fewer overall measurement reports, thereby reducing overhead, increasing efficiency, and decreasing the time needed to perform beam selection or fast switching.

Figure 2:
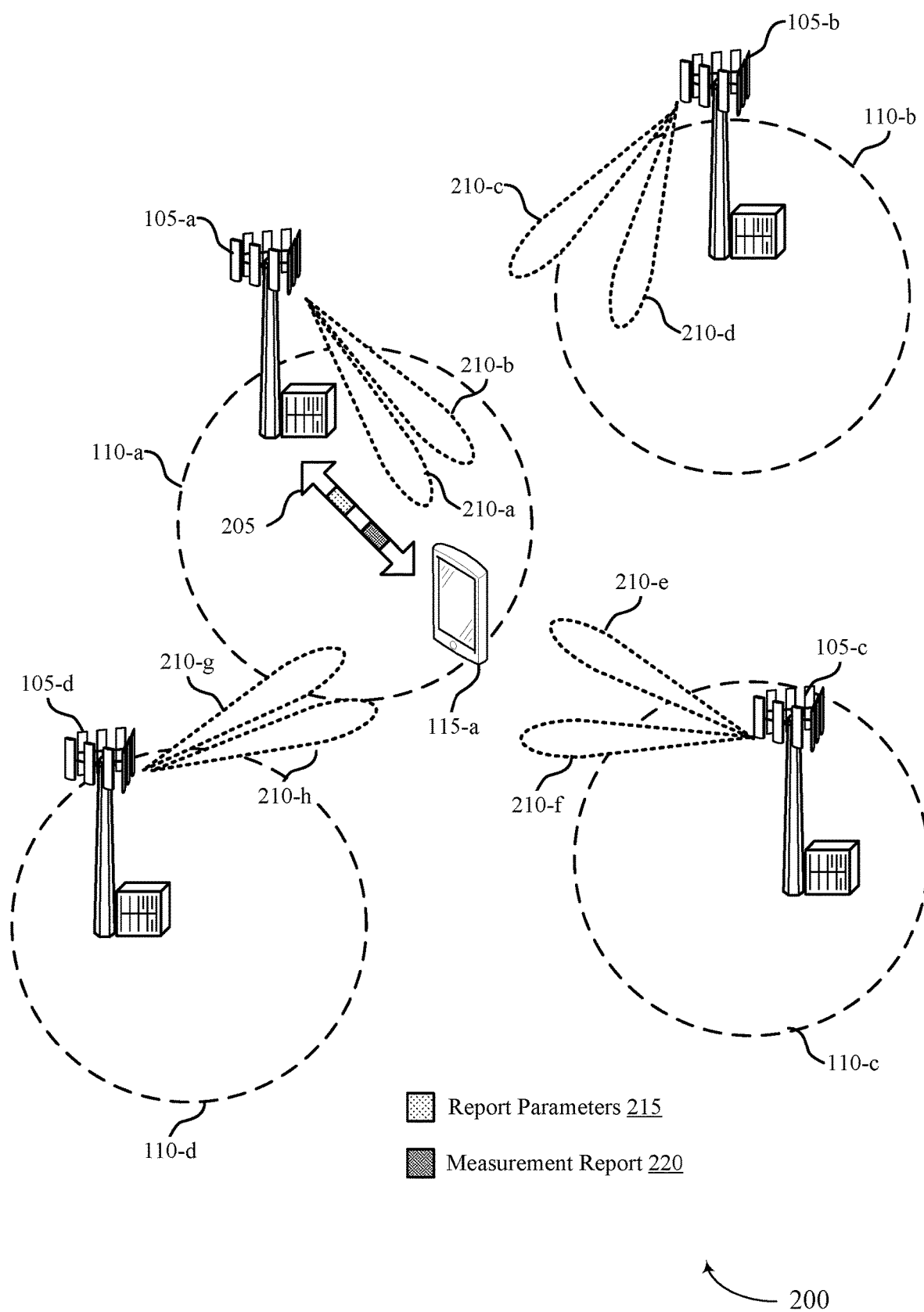

FIG. 2 illustrates an example of a wireless communications system 200 that supports measurement report with nested indexing in accordance with aspects of the present disclosure. The wireless communications system 200 may include a base station 105-*a*, a base station 105-*b*, a base station 105-*c*, a base station 105-*d*, and a UE 115-*a*, which may be examples of base stations 105 and a UE 115 as described with reference to FIG. 1. Each base station 105 may serve a cell 110. For example, the base station 105-*a* may serve a cell 110-*a*, the base station 105-*b* may serve the cell 110-*b*, the base station 105-*c* may serve the cell 110-*c*, and the base station 105-*d* may serve the cell 110-*d*.

The UE 115-*a* may communicate with the base station 105-*a* using a communication link 205. Additionally, the base stations 105 may communicate with the UE 115-*a* over one or more beams 210. As illustrated in FIG. 2, the base station 105-*a* may use the beam 210-*a* and the beam 210-*b*, the base station 105-*b* may use the beam 210-*c* and the beam 210-*d*, the base station 105-*c* may use the beam 210-*e* and the beam 210-*f*, and the base station 105-*d* may use the beam 210-*g* and the beam 210-*h*. For example, each of the base stations 105 may transmit one or more reference signals to the UE 115-*a* over one or more respective beams 210. The UE 115-*a* may measure the reference signals and report measurement information (e.g., as part of a measurement report 220, such as a CSI report) for the reference signals and associated beams 210 to the base station 105-*a*, for example, as part of a beam refinement, beam management, or beam selection procedure. In some examples, the base station 105-*a* may transmit an indication of report parameters 215 for the UE 115-*a* to use in reporting measurement information. For example, the UE 115-*a* may transmit a measurement report 220 to the base station 105-*a* in accordance with the indicated report parameters 215.

In some cases, the UE 115-*a* may transmit, to the base station 105-*a*, a cell-specific measurement report 220 for each cell 110. That is, the UE 115-*a* may report measurement information for reference signals received over beams 210 associated with a cell 110 in separate reports. In the example of FIG. 2, the UE 115-*a* may transmit four total measurement reports. The UE 115-*a* may transmit a first measurement report 220 that includes measurement information for the beams 210-a and 210-b, as the beams 210-a and 210-b are associated with the first cell 110-a. The UE 115-a may transmit a second measurement report 220 that includes measurement information for the beams 210-c and 210-d (e.g., associated with the second cell 110-b), a third measurement report 220 that includes measurement information for the beams 210-e and 210-f (e.g., associated with the third cell 110-c), and a fourth measurement report 220 that includes measurement information for the beams 210-g and 210-h (e.g., associated with the fourth cell 110-d). In such cases, each measurement report 220 may include a report number (e.g., a CSI report number) and a number of CSI fields, as illustrated below in Table 1.

TABLE 1

| CSI report number | CSI fields |
|---|---|
| CSI report number | CRI or SSBRI #1 |
|  | CRI or SSBRI #2 |
|  | CRI or SSBRI #3 |
|  | CRI or SSBRI #4 |
|  | SINR #1 |
|  | Differential SINR #2 |
|  | Differential SINR #3 |
|  | Differential SINR #4 |

The measurement report 220, as illustrated in Table 1, may include resource indicators (e.g., CRIs or SSBRIs) for each reported reference signal and measurement values corresponding to each beam 210 associated with each reported reference signal. A resource indicator may indicate a reported beam 210 by indicating the resources over which the UE 115-a received the corresponding reference signal. The measurement values may be absolute values or differential values. For example, in Table 1, the CSI fields include an absolute SINR value (e.g., SINR #1) and three differential SINR values, where the differential SINR values are relative to the absolute SINR value. In this example, the absolute SINR value may be the highest SINR value measured by the UE 115-a. That is, the UE 115-a may report the resource indicator and measurement value for the strongest beam 210 (e.g., the beam 210 with the highest SINR value) first, and the remaining measurement values for the remaining reported beams 210 may be indicated with respect to the first measurement value.

However, reporting measurement information on a cell-specific basis may increase overhead and resource utilization, especially as the number of cells and the number of reported beams increases. For example, the number of measurement reports 220 generated and transmitted by the UE 115-a increases as the number of cells increases. Thus, the techniques described herein enable the UE 115-a to instead report measurement information for beams 210 associated with multiple (e.g., different) cells 110 in a single measurement report 220. For example, in addition to resource indicators and measurement values (e.g., as illustrated in Table 1), the measurement report 220 may include cell identifiers to indicate which cell 110 a reported beam 210 is associated with. Further, the resource indicators or measurement values included in the measurement report 220 may be associated with the cell identifiers (e.g., may be associated with the fields including the cell identifiers or may indicate an association with the cell identifiers).

In the example of FIG. 2, according to the techniques described herein, the UE 115-a may generate and transmit a measurement report 220 that includes measurement information for one or more beams 210 associated with one or more cells 110. For example, the UE 115-a may generate and transmit a measurement report 220 that includes measurement information for the cell 110-a and the cell 110-b. That is, the UE 115-a may receive one or more reference signals from the cell 110-a over the beams 210-a and 210-b, and one or more reference signals from the cell 110-b over the beams 210-c and 210-d. The UE 115-a may perform a set of measurements of the reference signals to generate the measurement report 220. The measurement report 220 may include a first identifier associated with the cell 110-a and a second identifier associated with the cell 110-b. The first and second identifiers may be examples of cell identifiers, receive panel identifiers (e.g., associated with respective receive panels of the UE 115-a), or the like. In some examples, the UE 115-a may measure reference signals from cells 110-c or 110-d such as one or more reference signals received via beams 210-e, 210-f, 210-g, and 210-h. Such measurements may be included in the measurement report 220 as a differential measurement relative to the strongest beam measured by the UE 115-a or as an absolute value if one of measured beams 210-e, 210-f, 210-g, and 210-h are measured as the strongest.

The measurement report 220 may further include resource indicators for each respective reference signal received over a beam 210. For instance, the measurement report 220 may include a first resource indicator for a first reference signal received over the beam 210-a, a second resource indicator for a second reference signal received over the beam 210-b, a third resource indicator for a third reference signal received over the beam 210-c, and a fourth resource indicator for a fourth reference signal received over the beam 210-d. The resource indicators may be, for example, CRIs, SSBRIs, or the like.

Additionally, the measurement report 220 may include signal measurements for each respective reference signal, e.g., associated with each respective resource indicator and based on the measurements performed by the UE 115-a. The measurement report 220 may therefore include a signal measurement (e.g., a measurement value, such as an SINR, an SNR, an RSRP, a reference signal strength indicator, etc.) for the beam 210-a (and associated with the first resource indicator), a signal measurement for the beam 210-b (associated with the second resource indicator), a signal measurement for the beam 210-c (associated with the third resource indicator), and a signal measurement for the beam 210-d (associated with the fourth resource indicator).

The resource indicators (and, consequentially, the signal measurements) may be associated with the identifiers based on the beam 210 associated with the resource indicator. For example, the resource indicator for the beam 210-a may be associated with the first identifier corresponding to the cell 110-a, e.g., because the reference signal received over beam 210-a was transmitted from the cell 110-a. The resource indicator for the beam 210-b may likewise be associated with the first identifier, while the resource indicators for the beams 210-c and 210-d, respectively, may be associated with the second identifier corresponding to the cell 110-b. In some examples, the measurement report 220 may include fields for each respective identifier, resource indicator, and measurement value, where the resource indicators are associated with the identifiers based on an association between the respective fields. That is, the resource indicator for the beam 210-a and the resource indicator for the beam 210-b may be associated with the field that includes the first identifier, and the resource indicator for the beam 210-c and the resource indicator for the beam 210-*d* may be associated with the field that includes the second identifier.

In some examples, based on the association between the resource indicators and the corresponding cell identifiers, the measurement report 220 may be an example of a nested index measurement report. The nested index measurement report may include an index common to one or more other fields in the measurement report 220. For example, the index may be the first identifier corresponding to the cell 110-*a*, as the first identifier is common to both the resource indicator associated with the beam 210-*a* and the resource indicator associated with the beam 210-*b*.

Additionally, in some examples, the report parameters 215 may indicate the number of reported beams and the number of reported values for each field of the nested index measurement report. For instance, the report parameters 215 may indicate that the measurement report 220 includes a reported RSRP for each of the four beams 210-*a*, 210-*b*, 210-*c*, and 210-*d* from the two cells 110-*a* and 110-*b*, respectively. The report parameters 215 may indicate that the cells 110-*a* and 110-*b* are to be indicated by the first and second identifiers, e.g., as common indexes for the respective beams 210.

Figure 3:
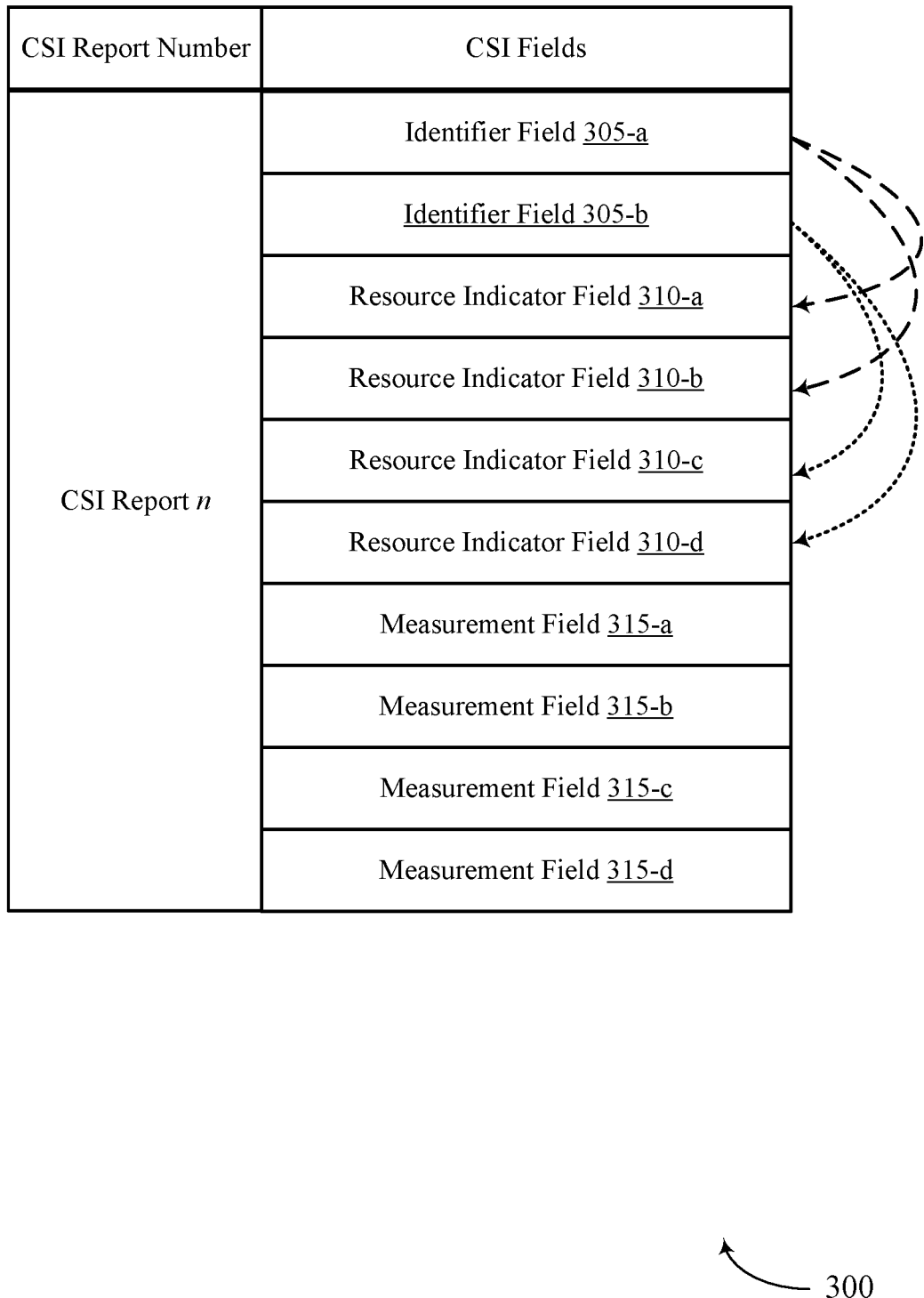
FIG. 3 illustrates an example of a measurement report format that supports measurement report with nested indexing in accordance with aspects of the present disclosure.

FIG. 3 illustrates an example of a measurement report format 300 that supports measurement report with nested indexing in accordance with aspects of the present disclosure. In some examples, the measurement report format 300 may implement aspects of or be implemented by the wireless communications systems 100 or 200. For example, the measurement report format 300 may be used by a UE 115 and a base station 105 for transmitting a measurement report associated with multiple cells. It is to be understood that while FIG. 3 illustrates a measurement report format 300 for a CSI report, the measurement report format 300 may be implemented as part of a measurement report (e.g., an L1 report).

As described herein, a UE may receive multiple reference signals from multiple cells over multiple beams. For example, the UE may receive a first reference signal over a first beam and a second reference signal over a second beam, where the first beam and the second beam are associated with a first cell. Additionally, the UE may receive a third reference signal over a third beam and a fourth reference signal over a fourth beam, where the third beam and the fourth beam are associated with a second cell. The UE may perform measurements for the reference signals and may report the measurements to a base station in a measurement report, e.g., according to the measurement report format 300. The measurement report format 300 may include a CSI report number that identifies the CSI report and CSI fields. The CSI fields may include, but are not limited to, identifier fields 305, resource indicator fields 310, and measurement fields 315.

The identifier fields 305 may include indications of identifiers corresponding to the first and second cells. For example, the identifier field 305-*a* may include (e.g., may indicate) a first identifier corresponding to the first cell and the identifier field 305-*b* may include (e.g., may indicate) a second identifier corresponding to the second cell. The identifiers may be examples of cell identifiers associated with the corresponding cell or receive panel identifiers associated with a corresponding receive panel of the UE. For instance, if the first beam was transmitted from the first cell, the identifier field 305-*a* may include an indication of a cell identifier for the first cell. If the first beam was received at a first receive panel of the UE, the identifier field 305-*a* may include an indication of a receive panel identifier for the first receive panel.

The resource indicator fields 310 may each include an indication of a resource indicator for each respective reference signal. For example, the resource indicator field 310-*a* may include (e.g., may indicate) a first resource indicator for the first reference signal that is associated with the first beam. The resource indicator field 310-*b* may include (e.g., may indicate) a second resource indicator for the second reference signal associated with the second beam. The resource indicator field 310-*c* may include (e.g., may indicate) a third resource indicator for the third reference signal associated with the third beam, and the resource indicator field 310-*d* may include (e.g., may indicate) a fourth resource indicator for the fourth reference signal associated with the fourth beam. The resource indicators may include, but are not limited to, CRIs, SSBRIs, or the like.

The measurement report format 300 may support reporting measurements for multiple beams associated with multiple cells by including an indication of the cells associated with respective reported beams. For example, the measurement report format 300 may indicate a relationship (i.e., an association) between the cells and the reported beams via the identifier fields 305 and the resource indicator fields 310, such that the base station may determine which of the reported beams correspond to the indicated cells. The resource indicator fields 310 and the identifier fields 305 may be configured to be associated with one another or may indicate an association with one another based on the identified cells and the beams associated with the resource indicators. For example, the first and second reference signals associated with the first and second beams and the first and second resource indicators, respectively, are both also associated with the first cell indicated by the first identifier. Thus, the measurement report format 300 may communicate the relationship between each reported reference signal and corresponding cell via the association between the identifier fields 305 and the resource indicator fields 310. For example, the resource indicator fields 310-*a* and 310-*b* (e.g., associated with the first and second reference signals, respectively) may be associated with the identifier field 305-*a* (e.g., associated with the first cell). The identifier field 305-*b* may likewise be associated with the resource indicator fields 310-*c* and 310-*d*.

In some examples, the base station may configure the measurement report format 300, for example, as part of CSI report setting (e.g., by configuring parameters for measurement report transmission). In such examples, the relationship between the cells and the reported beams may be indicated based on the configuration, e.g., where each identifier field 305 is configured to be associated with a specified one or more resource indicator fields 310. For example, the measurement report format 300 may be configured such that the first identifier field 305-*a* is associated with a first resource indicator field 310-*a* and a second resource indicator field 310-*b*, and the second identifier field 305-*b* is associated with a third resource indicator field 310-*c* and a fourth resource indicator field 310-*d*.

Additionally, or alternatively, the relationship between the cells and the reported beams may be indicated by the resource indicators included in the resource indicator fields 310. For example, the first resource indicator may include an indication of the identifier that corresponds to the cell associated with the beam indicated by the first resource indicator. Put another way, the resource indicator included in resource indicator field 310-*a* may include an indication that the resource indicator is associated with the cell indicated by the identifier included in the identifier field 305-*a*.

Additionally, or alternatively, the resource indicators included in the resource indicator fields 310-*a* and 310-*b* may be associated with the identifier field 305-*a*. For instance, the resource indicator included in the resource indicator field 310-*a* may include a bit value that indicates the identifier included in the identifier field 305-*a* or a bit value that indicates the identifier field 305-*a*.

The measurement fields 315 may include measurement values for the beams associated with the resource indicators included in the resource indicator fields 310, e.g., based on the measurements of the reference signals performed by the UE. For example, the UE may measure an RSRP, an SINR, an SNR, an RSSI, or some combination thereof, for each of the reference signals, and may include the resulting measurement value in the corresponding measurement field 315. In some examples, the measurement values may be absolute values, while in other examples, the measurement values may be differential measurement values. In still other examples, the measurement fields 315 may include a combination of absolute and differential measurement values. For instance, the measurement field 315-*a* may include an absolute measurement value for the strongest beam (e.g., a highest measurement value), and the measurement fields 315-*b*, 315-*c*, and 315-*d* may include differential measurement values relative to the absolute measurement value.

In some examples, the measurement report format 300 may be configured based on one or more parameters for transmission of the measurement report. For instance, the one or more parameters may define the contents of the measurement report or the number of cells and/or beams to be reported. As an example, the one or more parameters may include a number of signal measurements, a number of cells, or a number of beams for each cell to be included in the measurement report. In some cases, the base station may transmit, to the UE, a message indicating the one or more parameters, such that the UE may transmit the measurement report in accordance with the one or more parameters.

Figure 4:
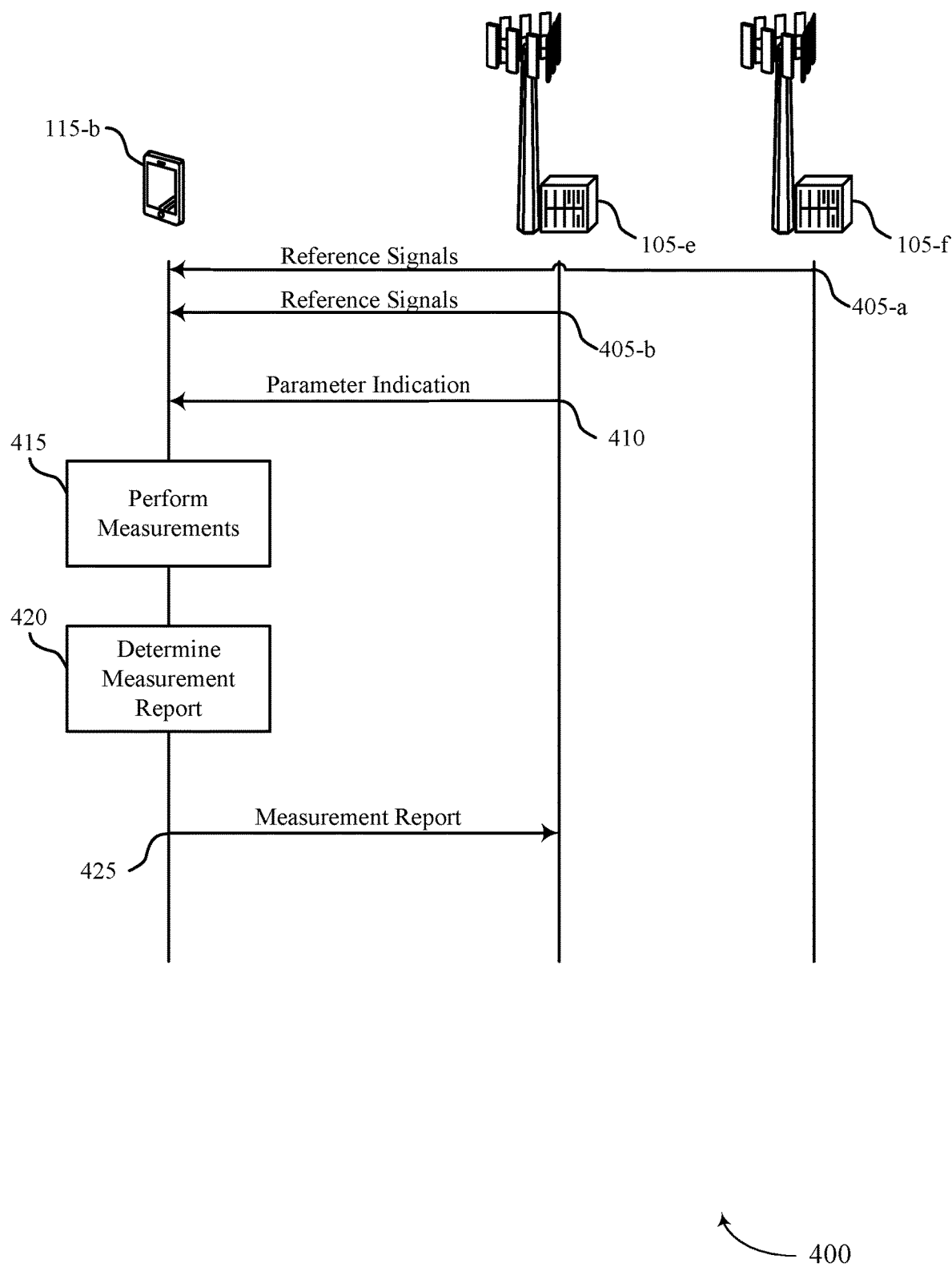
FIG. 4 illustrates an example of a process flow that supports measurement report with nested indexing in accordance with aspects of the present disclosure.

FIG. 4 illustrates an example of a process flow 400 that supports measurement report with nested indexing in accordance with aspects of the present disclosure. In some examples, the process flow 400 may implement aspects of wireless communication systems 100 or 200. For example, the process flow 400 may include a base station 105-*e* associated with a first cell, a base station 105-*f* associated with a second cell, and a UE 115-*b*, which may be examples of corresponding wireless devices as described herein. In the following description of the process flow 400, the operations between the base station 105-*e*, the base station 105-*f*, and the UE 115-*b* may be transmitted in a different order than the order shown, or the operations performed by the base station 105-*e*, the base station 105-*f*, and the UE 115-*b* may be performed in different orders or at different times. Certain operations may also be left out of the process flow 400, or other operations may be added to the process flow 400. While the base station 105-*e*, the base station 105-*f*, and the UE 115-*b* are shown performing operations of process flow 400, any wireless device may perform the operations shown. Further, while FIG. 4 illustrates an example of communications between the base station 105-*e*, the base station 105-*f*, and the UE 115-*b*, the techniques described herein may be applied to communications between any number of wireless devices.

At 405-*a*, the base station 105-*e* may transmit, and the UE 115-*b* may receive, one or more reference signals over one or more beams associated with the first cell. At 405-*b*, the base station 105-*f* may transmit, and the UE 115-*b* may receive, one or more reference signals over one or more beams associated with the second cell.

At 410, the base station 105-*e* may transmit, and the UE 115-*b* may receive, a message indicating parameters for transmission of a measurement report associated with the one or more reference signals received at 405-*a* and 405-*b*. For example, the one or more parameters may include, but are not limited to, a number of signal measurements, a number of cells, a number of beams for each cell included in the measurement report, or some combination thereof, for the UE 115-*b* to include in the measurement report.

At 415, the UE 115-*b* may measure the one or more reference signals received at 405-*a* and 405-*b*. The UE 115-*b* may measure an RSRP, an SNR, an SINR, or a reference signal strength indicator, among other examples, for each reference signal of the one or more reference signals. In some examples, the UE 115-*b* may determine differential measurements for one or more of the reference signals, e.g., relative to an absolute signal measurement.

At 420, the UE 115-*b* may determine (e.g., may generate) the measurement report based on the measurements performed at 415 and the parameters indicated at 410. The measurement report may include a first field indicating a first identifier corresponding to the first cell, a second field indicating a second identifier corresponding to the second cell, and a number of additional fields to indicate resource indicators and measurements for each reference signal of the one or more reference signals. The first identifier and second identifier may each be examples of cell identifiers or receive panel identifiers associated with respective receive panels of the UE 115-*b*.

At 425, the UE 115-*b* may transmit, and the base station 105-*e* may receive, the measurement report determined at 420. The measurement report may be an example of an L1 measurement report, a CSI report, or some combination thereof. The UE 115-*b* may transmit, in the measurement report, a first resource indicator (e.g., a CRI, an SSBRI) for a first reference signal of the one or more reference signals and a second resource indicator (e.g., a CRI, an SSBRI) for a second reference signal of the one or more reference signals. The first resource indicator may be associated with the first identifier and the second resource indicator may be associated with the second identifier. Additionally, the UE 115-*b* may transmit, in the measurement report, a first signal measurement associated with the first resource indicator and corresponding to a first beam of the first cell, and a second signal measurement associated with the second resource indicator and corresponding to a second beam of the second cell. In some examples, the UE 115-*b* may transmit, in the measurement report, a third signal measurement associated with a third resource indicator corresponding to the first cell and a fourth signal measurement associated with a fourth resource indicator corresponding to the second cell.

Figure 5:
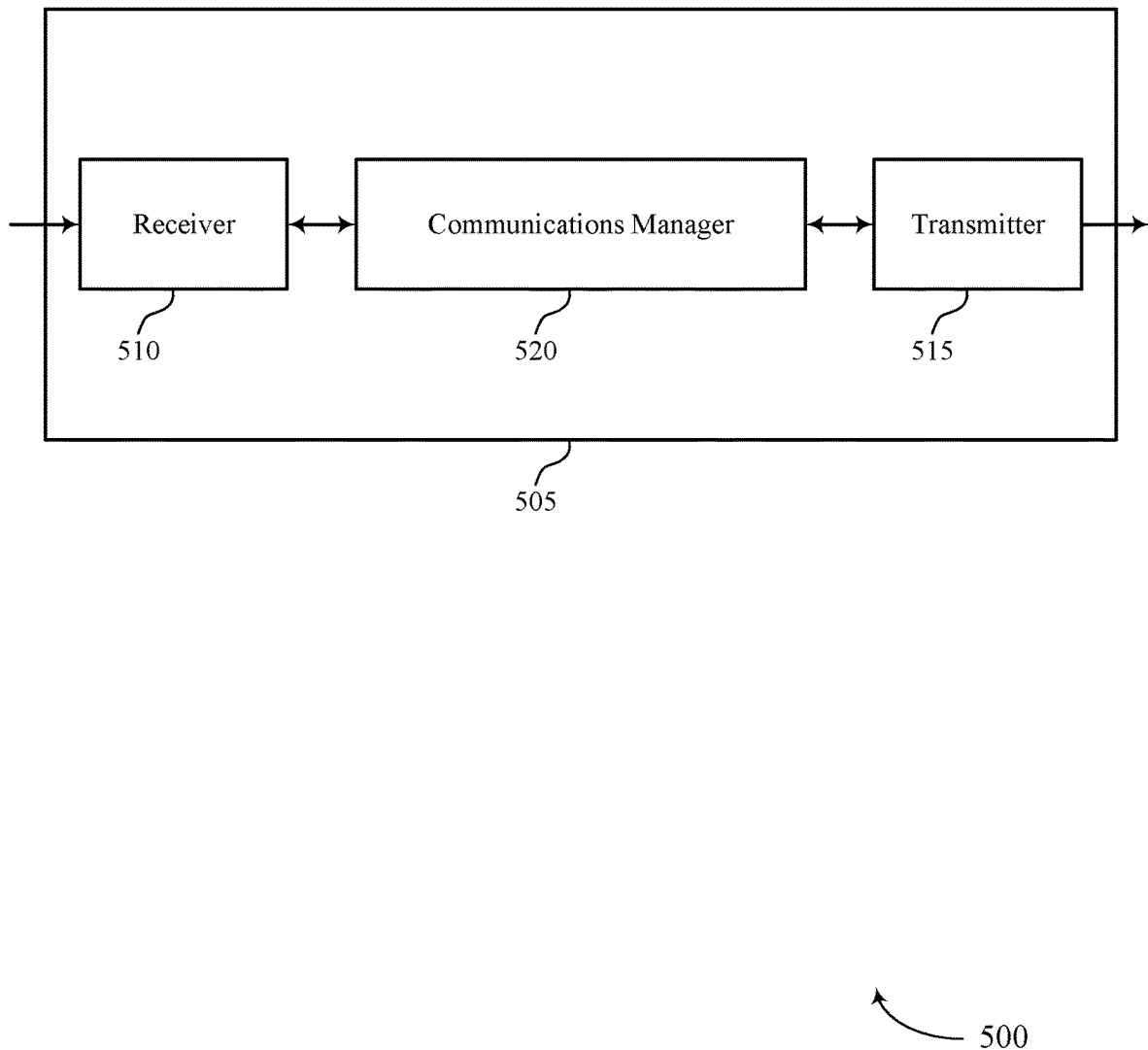
FIGS. 5 and 6 show block diagrams of devices that support measurement report with nested indexing in accordance with aspects of the present disclosure.

FIG. 5 shows a block diagram 500 of a device 505 that supports measurement report with nested indexing in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to measurement report with nested indexing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to measurement report with nested indexing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of measurement report with nested indexing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving a set of multiple reference signals from a set of multiple cells. The communications manager 520 may be configured as or otherwise support a means for performing a set of measurements of the set of multiple reference signals based on the receiving. The communications manager 520 may be configured as or otherwise support a means for transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

By including or configuring the communications manager 520 in accordance with examples as described herein, the device 505 (e.g., a processor controlling or otherwise coupled to the receiver 510, the transmitter 515, the communications manager 520, or a combination thereof) may support more efficient beam selection and measurement reporting by including measurement information for multiple beams associated with multiple cells in a single report. Measurement reports with nested indexing as described herein may be smaller in size than cell-specific measurement reports, which may enable the device 505 to reduce complexity in measurement reporting and transmit fewer overall measurement reports.

Figure 6:
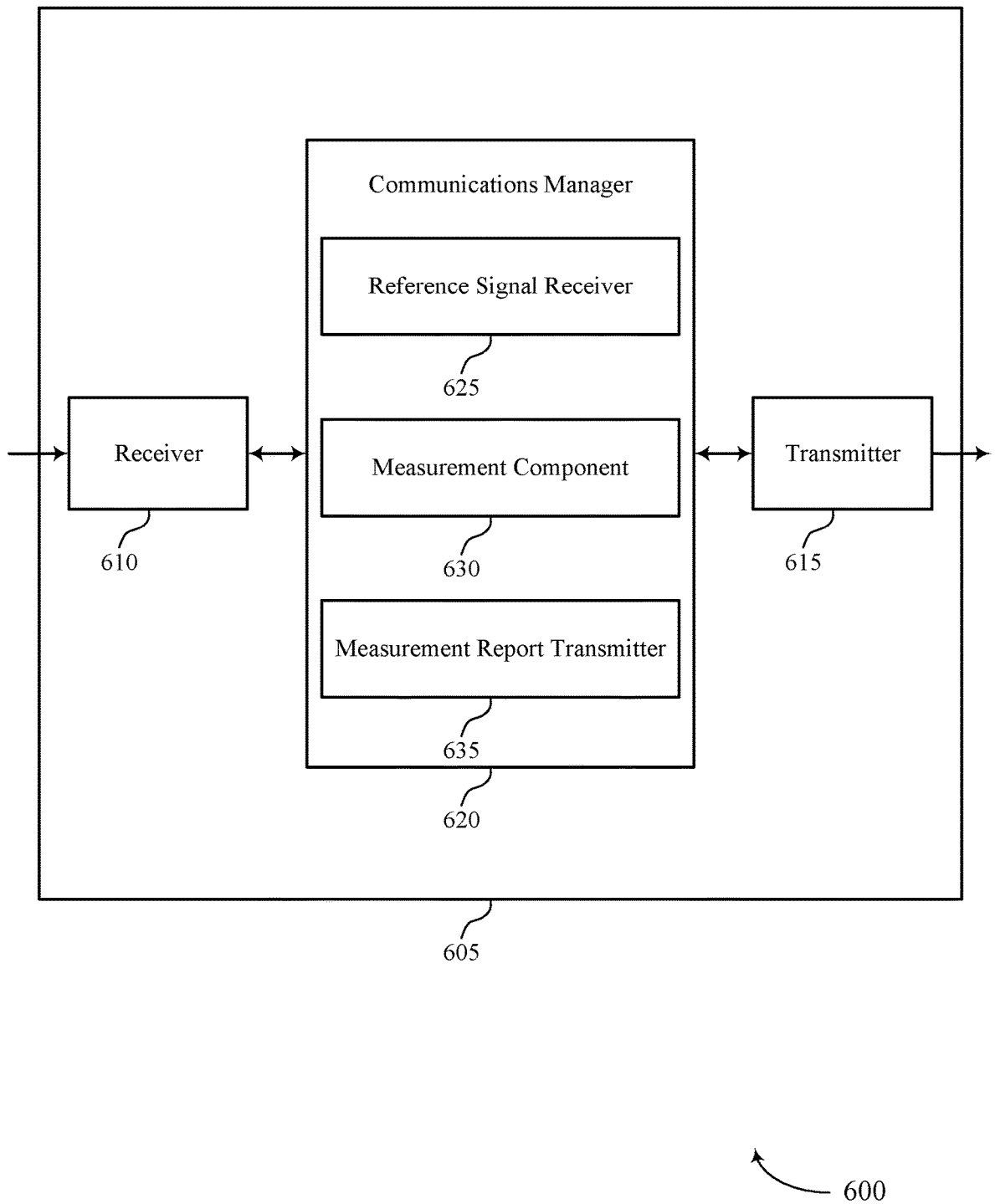

FIG. 6 shows a block diagram 600 of a device 605 that supports measurement report with nested indexing in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to measurement report with nested indexing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to measurement report with nested indexing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of measurement report with nested indexing as described herein. For example, the communications manager 620 may include a reference signal receiver 625, a measurement component 630, a measurement report transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The reference signal receiver 625 may be configured as or otherwise support a means for receiving a set of multiple reference signals from a set of multiple cells. The measurement component 630 may be configured as or otherwise support a means for performing a set of measurements of the set of multiple reference signals based on the receiving. The measurement report transmitter 635 may be configured as or otherwise support a means for transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

Figure 7:
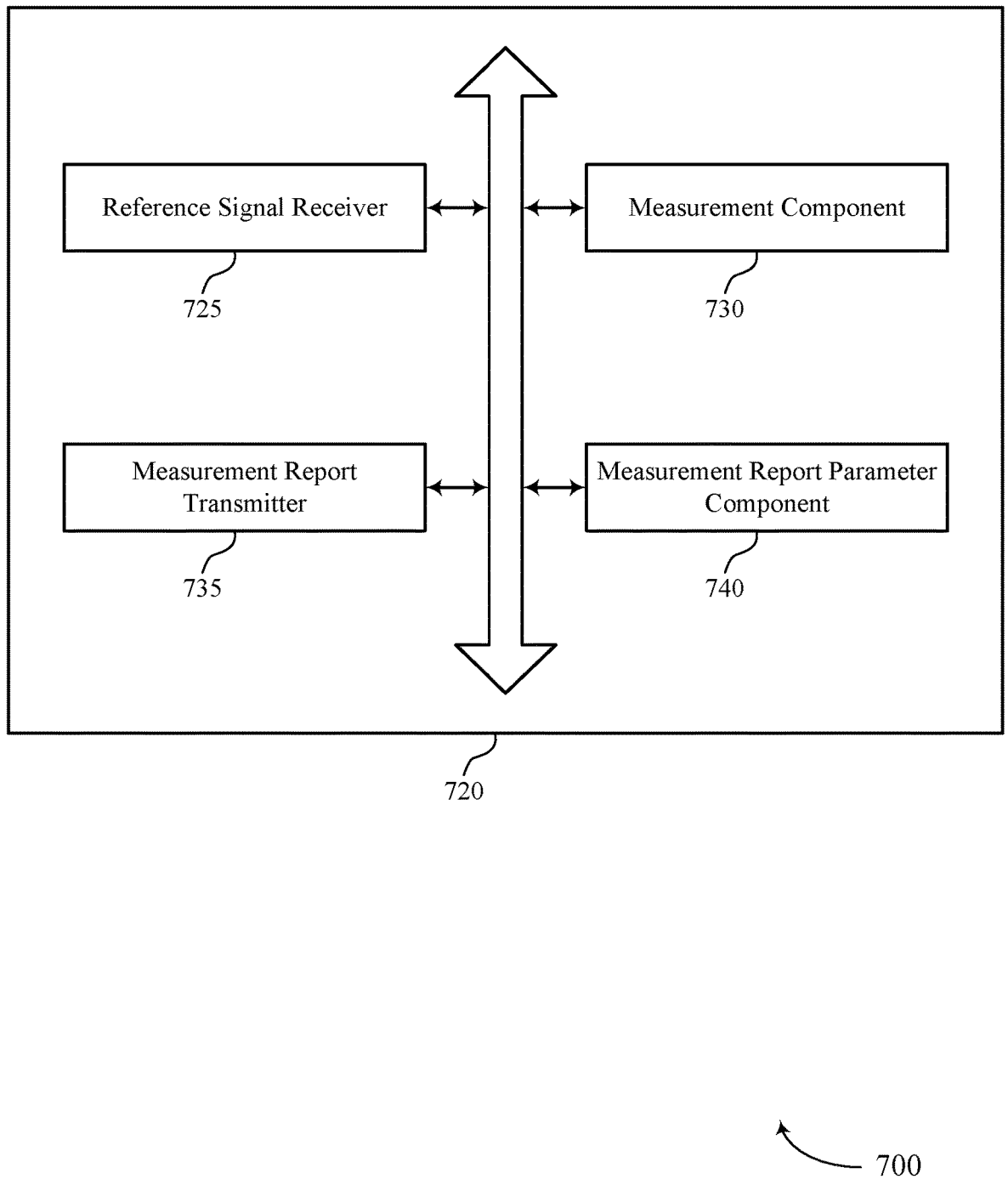
FIG. 7 shows a block diagram of a communications manager that supports measurement report with nested indexing in accordance with aspects of the present disclosure.

FIG. 7 shows a block diagram 700 of a communications manager 720 that supports measurement report with nested indexing in accordance with aspects of the present disclosure. The communications manager 720 may be an example of aspects of a communications manager 520, a communications manager 620, or both, as described herein. The communications manager 720, or various components thereof, may be an example of means for performing various aspects of measurement report with nested indexing as described herein. For example, the communications manager 720 may include a reference signal receiver 725, a measurement component 730, a measurement report transmitter 735, a measurement report parameter component 740, or any combination thereof. Each of these components may communicate, directly or indirectly, with one another (e.g., via one or more buses).

The communications manager 720 may support wireless communications at a UE in accordance with examples as disclosed herein. The reference signal receiver 725 may be configured as or otherwise support a means for receiving a set of multiple reference signals from a set of multiple cells. The measurement component 730 may be configured as or otherwise support a means for performing a set of measurements of the set of multiple reference signals based on the receiving. The measurement report transmitter 735 may be configured as or otherwise support a means for transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

In some examples, to support transmitting the measurement report, the measurement report transmitter 735 may be configured as or otherwise support a means for transmitting, in the measurement report, a first resource indicator for a first reference signal of the set of multiple reference signals and a second resource indicator for a second reference signal of the set of multiple reference signals, the first resource indicator associated with the first identifier corresponding to the first cell and the second resource indicator associated with the second identifier corresponding to the second cell.

In some examples, to support transmitting the measurement report, the measurement report transmitter 735 may be configured as or otherwise support a means for transmitting, in the measurement report, a first signal measurement associated with the first resource indicator and a second signal measurement associated with the second resource indicator, where the first resource indicator and the first reference signal correspond to a first beam of the first cell, and the second resource indicator and the second reference signal correspond to a second beam of the second cell.

In some examples, to support transmitting the measurement report, the measurement report transmitter 735 may be configured as or otherwise support a means for transmitting, in the measurement report, a third signal measurement associated with a third resource indicator and a fourth signal measurement associated with a fourth resource indicator, where the third resource indicator corresponds to the first cell and the fourth resource indicator corresponds to the second cell.

In some examples, the second signal measurement includes a differential measurement relative to the first signal measurement. In some examples, the first and second resource indicators include one of a channel state information resource indicator or a synchronization signal block resource indicator.

In some examples, the measurement report parameter component 740 may be configured as or otherwise support a means for receiving a message indicating one or more parameters for transmission of the measurement report, where the one or more parameters includes a number of signal measurements to include in the measurement report, a number of cells to include in the measurement report, a number of beams for each cell included in the measurement report, or any combination thereof.

In some examples, to support transmitting the measurement report, the measurement report transmitter 735 may be configured as or otherwise support a means for transmitting the measurement report in accordance with the one or more parameters, where the measurement report includes the number of signaling measurements, the number of cells, and the number of beams for each cell.

In some examples, to support transmitting the measurement report, the measurement report transmitter 735 may be configured as or otherwise support a means for transmitting a nested index measurement report, the nested index measurement report including an index common to one or more other fields in the measurement report.

In some examples, the index includes the first identifier, where the first field is associated with the one or more other fields in the measurement report.

In some examples, to support performing the set of measurements of the set of multiple reference signals, the measurement component 730 may be configured as or otherwise support a means for measuring one or more of a reference signal received power, a signal to noise ratio, a signal to interference plus noise ratio, a reference signal strength indicator, or any combination thereof for the set of multiple reference signals.

In some examples, to support transmitting the measurement report, the measurement report transmitter 735 may be configured as or otherwise support a means for transmitting a layer 1 (L1) measurement report, a channel state information report, or any combination thereof.

In some examples, the first identifier includes a first cell identifier associated with the first cell or a receive panel identifier associated with a first receive panel of the UE and the second identifier includes a second cell identifier associated with the second cell or a second receive panel identifier associated with a second receive panel of the UE.

Figure 8:
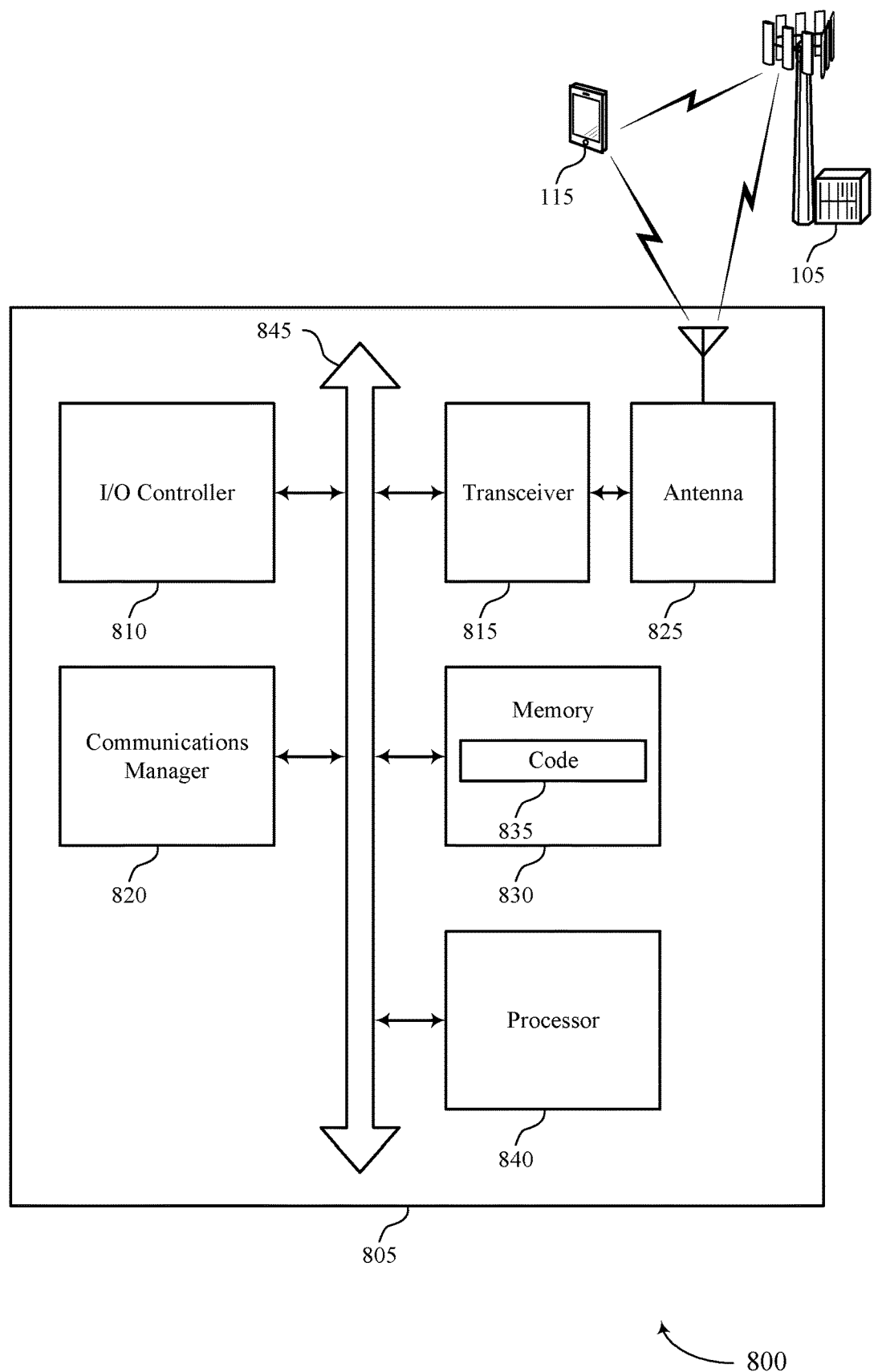
FIG. 8 shows a diagram of a system including a device that supports measurement report with nested indexing in accordance with aspects of the present disclosure.

FIG. 8 shows a diagram of a system 800 including a device 805 that supports measurement report with nested indexing in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement report with nested indexing). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a set of multiple reference signals from a set of multiple cells. The communications manager 820 may be configured as or otherwise support a means for performing a set of measurements of the set of multiple reference signals based on the receiving. The communications manager 820 may be configured as or otherwise support a means for transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell.

By including or configuring the communications manager 820 in accordance with examples as described herein, the device 805 may support techniques for more efficient beam selection and measurement reporting by including measurement information for multiple beams associated with multiple cells in a single report. Transmitting fewer overall reports may enable the device 805 to reduce system overhead and increase network efficiency, e.g., by more efficiently using network resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of measurement report with nested indexing as described herein, or the processor 840 and the memory 830 may be otherwise configured to perform or support such operations.

Figure 9:
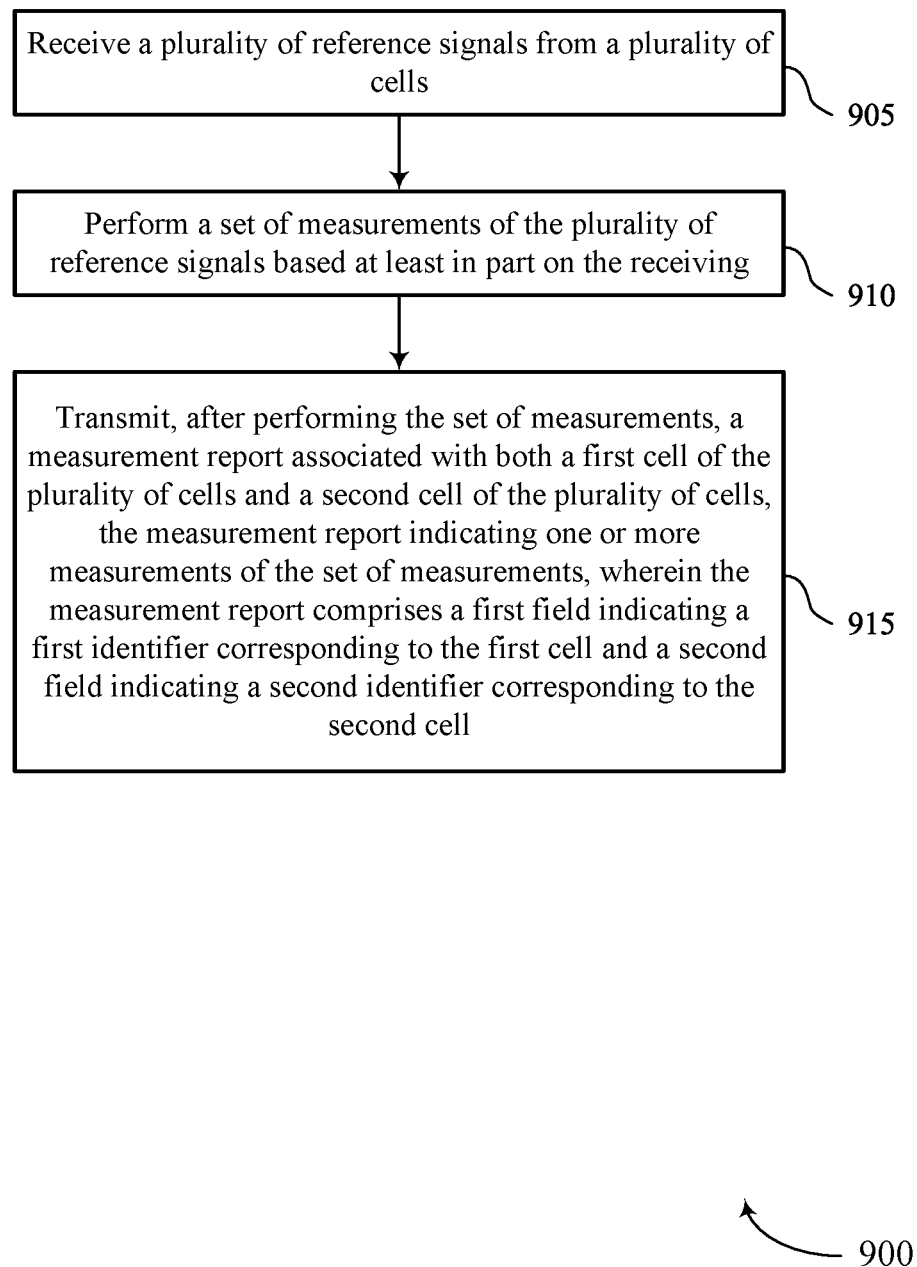
FIGS. 9 and 10 show flowcharts illustrating methods that support measurement report with nested indexing in accordance with aspects of the present disclosure.

FIG. 9 shows a flowchart illustrating a method 900 that supports measurement report with nested indexing in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a set of multiple reference signals from a set of multiple cells. The operations of 905 may be performed in accordance with examples as disclosed herein. In some examples, aspects of the operations of 905 may be performed by a reference signal receiver 725 as described with reference to FIG. 7.

At 910, the method may include performing a set of measurements of the set of multiple reference signals based on the receiving. The operations of 910 may be performed in accordance with examples as disclosed herein. In some examples, aspects of the operations of 910 may be performed by a measurement component 730 as described with reference to FIG. 7.

At 915, the method may include transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell. The operations of 915 may be performed in accordance with examples as disclosed herein. In some examples, aspects of the operations of 915 may be performed by a measurement report transmitter 735 as described with reference to FIG. 7.

Figure 10:
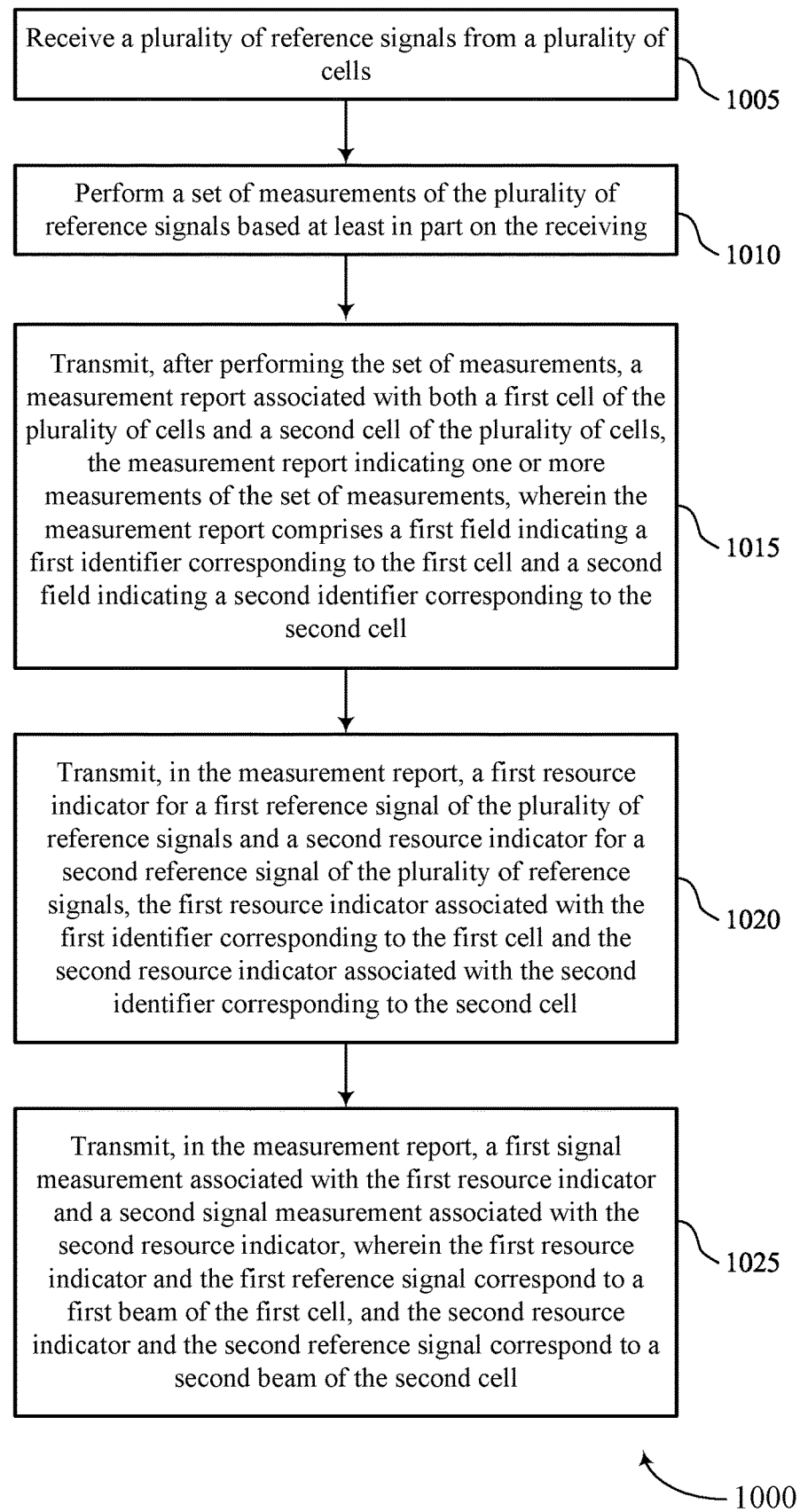

FIG. 10 shows a flowchart illustrating a method 1000 that supports measurement report with nested indexing in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a set of multiple reference signals from a set of multiple cells. The operations of 1005 may be performed in accordance with examples as disclosed herein. In some examples, aspects of the operations of 1005 may be performed by a reference signal receiver 725 as described with reference to FIG. 7.

At 1010, the method may include performing a set of measurements of the set of multiple reference signals based on the receiving. The operations of 1010 may be performed in accordance with examples as disclosed herein. In some examples, aspects of the operations of 1010 may be performed by a measurement component 730 as described with reference to FIG. 7.

At 1015, the method may include transmitting, after performing the set of measurements, a measurement report associated with both a first cell of the set of multiple cells and a second cell of the set of multiple cells, the measurement report indicating one or more measurements of the set of measurements, where the measurement report includes a first field indicating a first identifier corresponding to the first cell and a second field indicating a second identifier corresponding to the second cell. The operations of 1015 may be performed in accordance with examples as disclosed herein. In some examples, aspects of the operations of 1015 may be performed by a measurement report transmitter 735 as described with reference to FIG. 7.

At 1020, the method may include transmitting, in the measurement report, a first resource indicator for a first reference signal of the set of multiple reference signals and a second resource indicator for a second reference signal of the set of multiple reference signals, the first resource indicator associated with the first identifier corresponding to the first cell and the second resource indicator associated with the second identifier corresponding to the second cell. The operations of 1020 may be performed in accordance with examples as disclosed herein. In some examples, aspects of the operations of 1020 may be performed by a measurement report transmitter 735 as described with reference to FIG. 7.

At 1025, the method may include transmitting, in the measurement report, a first signal measurement associated with the first resource indicator and a second signal measurement associated with the second resource indicator, where the first resource indicator and the first reference signal correspond to a first beam of the first cell, and the second resource indicator and the second reference signal correspond to a second beam of the second cell. The operations of 1025 may be performed in accordance with examples as disclosed herein. In some examples, aspects of the operations of 1025 may be performed by a measurement report transmitter 735 as described with reference to FIG. 7.

The following provides an overview of aspects of the present disclosure:

Aspect 1: A method for wireless communications at a UE, comprising: receiving a plurality of reference signals from a plurality of cells; performing a set of measurements of the plurality of reference signals based at least in part on the receiving; and transmitting, after performing the set of measurements, a measurement report associated with both a first cell of the plurality of cells and a second cell of the plurality of cells, the measurement report indicating one or more measurements of the set of measurements, wherein the measurement report comprises a first field indicating a first identifier corresponding to the first cell and a second field indicating a second identifier corresponding to the second cell.

Aspect 2: The method of aspect 1, wherein transmitting the measurement report comprises: transmitting, in the measurement report, a first resource indicator for a first reference signal of the plurality of reference signals and a second resource indicator for a second reference signal of the plurality of reference signals, the first resource indicator associated with the first identifier corresponding to the first cell and the second resource indicator associated with the second identifier corresponding to the second cell.

Aspect 3: The method of aspect 2, wherein transmitting the measurement report comprises: transmitting, in the measurement report, a first signal measurement associated with the first resource indicator and a second signal measurement associated with the second resource indicator, wherein the first resource indicator and the first reference signal correspond to a first beam of the first cell, and the second resource indicator and the second reference signal correspond to a second beam of the second cell.

Aspect 4: The method of aspect 3, wherein transmitting the measurement report comprises: transmitting, in the measurement report, a third signal measurement associated with a third resource indicator and a fourth signal measurement associated with a fourth resource indicator, wherein the third resource indicator corresponds to the first cell and the fourth resource indicator corresponds to the second cell.

Aspect 5: The method of any of aspects 3 through 4, wherein the second signal measurement comprises a differential measurement relative to the first signal measurement; and the first and second resource indicators comprise one of a channel state information resource indicator or a synchronization signal block resource indicator.

Aspect 6: The method of any of aspects 1 through 5, further comprising: receiving a message indicating one or more parameters for transmission of the measurement report, wherein the one or more parameters comprises a number of signal measurements to include in the measurement report, a number of cells to include in the measurement report, a number of beams for each cell included in the measurement report, or any combination thereof.

Aspect 7: The method of aspect 6, wherein transmitting the measurement report comprises: transmitting the measurement report in accordance with the one or more parameters, wherein the measurement report comprises the number of signaling measurements, the number of cells, and the number of beams for each cell.

Aspect 8: The method of any of aspects 1 through 7, wherein transmitting the measurement report comprises: transmitting a nested index measurement report, the nested index measurement report comprising an index common to one or more other fields in the measurement report.

Aspect 9: The method of aspect 8, wherein the index comprises the first identifier, wherein the first field is associated with the one or more other fields in the measurement report.

Aspect 10: The method of any of aspects 1 through 9, wherein performing the set of measurements of the plurality of reference signals comprises: measuring one or more of a reference signal received power, a signal to noise ratio, a signal to interference plus noise ratio, a reference signal strength indicator, or any combination thereof for the plurality of reference signals.

Aspect 11: The method of any of aspects 1 through 10, wherein the transmitting the measurement report comprises: transmitting an L1 measurement report, a CSI report, or any combination thereof.

Aspect 12: The method of any of aspects 1 through 11, wherein the first identifier comprises a first cell identifier associated with the first cell or a receive panel identifier associated with a first receive panel of the UE and the second identifier comprises a second cell identifier associated with the second cell or a second receive panel identifier associated with a second receive panel of the UE.

Aspect 13: An apparatus for wireless communications at a UE, comprising a processor; memory coupled with the processor; and instructions stored in the memory and executable by the processor to cause the apparatus to perform a method of any of aspects 1 through 12.

Aspect 14: An apparatus for wireless communications at a UE, comprising at least one means for performing a method of any of aspects 1 through 12.

Aspect 15: A non-transitory computer-readable medium storing code for wireless communications at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a plurality of reference signals from a plurality of cells;
   performing a set of measurements of the plurality of reference signals based at least in part on the receiving; and
   transmitting, after performing the set of measurements, a measurement report associated with both a first cell of the plurality of cells and a second cell of the plurality of cells, the measurement report comprising a first field indicating a first identifier corresponding to the first cell a second field indicating a second identifier corresponding to the second cell, a first resource indicator associated with the first identifier, and a second resource indicator associated with the second identifier.

2. The method of claim 1, wherein transmitting the measurement report comprises:
   transmitting, in the measurement report, the first resource indicator for a first reference signal of the plurality of reference signals and the second resource indicator for a second reference signal of the plurality of reference signals.

3. The method of claim 2, wherein transmitting the measurement report comprises:
   transmitting, in the measurement report, a first signal measurement associated with the first resource indicator and a second signal measurement associated with the second resource indicator, wherein the first resource indicator and the first reference signal correspond to a first beam of the first cell, and the second resource indicator and the second reference signal correspond to a second beam of the second cell.

4. The method of claim 3, wherein transmitting the measurement report comprises:
   transmitting, in the measurement report, a third signal measurement associated with a third resource indicator and a fourth signal measurement associated with a fourth resource indicator, wherein the third resource indicator corresponds to the first cell and the fourth resource indicator corresponds to the second cell.

5. The method of claim 3, wherein:
   the second signal measurement comprises a differential measurement relative to the first signal measurement; and
   the first and second resource indicators comprise one of a channel state information resource indicator or a synchronization signal block resource indicator.

6. The method of claim 1, further comprising:
   receiving a message indicating one or more parameters for transmission of the measurement report, wherein the one or more parameters comprises a number of signal measurements to include in the measurement report, a number of cells to include in the measurement report, a number of beams for each cell included in the measurement report, or any combination thereof.

7. The method of claim 6, wherein transmitting the measurement report comprises:
   transmitting the measurement report in accordance with the one or more parameters, wherein the measurement report comprises the number of signaling measurements, the number of cells, and the number of beams for each cell.

8. The method of claim 1, wherein transmitting the measurement report comprises:
    transmitting a nested index measurement report, the nested index measurement report comprising an index common to one or more other fields in the measurement report.

9. The method of claim 8, wherein the index comprises the first identifier, wherein the first field is associated with the one or more other fields in the measurement report.

10. The method of claim 1, wherein performing the set of measurements of the plurality of reference signals comprises:
    measuring one or more of a reference signal received power, a signal to noise ratio, a signal to interference plus noise ratio, a reference signal strength indicator, or any combination thereof for the plurality of reference signals.

11. The method of claim 1, wherein the transmitting the measurement report comprises:
    transmitting a layer 1 (L1) measurement report, a channel state information report, or any combination thereof.

12. The method of claim 1, wherein the first identifier comprises a first cell identifier associated with the first cell or a receive panel identifier associated with a first receive panel of the UE and the second identifier comprises a second cell identifier associated with the second cell or a second receive panel identifier associated with a second receive panel of the UE.

13. An apparatus for wireless communications at a user equipment (UE), comprising:
    a processor;
    memory coupled with the processor; and
    instructions stored in the memory and executable by the processor to cause the apparatus to:
        receive a plurality of reference signals from a plurality of cells;
        perform a set of measurements of the plurality of reference signals based at least in part on the receiving; and
        transmit, after performing the set of measurements, a measurement report associated with both a first cell of the plurality of cells and a second cell of the plurality of cells, the measurement report comprising a first field indicating a first identifier corresponding to the first cell, a second field indicating a second identifier corresponding to the second cell, a first resource indicator associated with the first identifier, and a second resource indicator associated with the second identifier.

14. The apparatus of claim 13, wherein the instructions to transmit the measurement report are executable by the processor to cause the apparatus to:
    transmit, in the measurement report, a first resource indicator for a first reference signal of the plurality of reference signals and a second resource indicator for a second reference signal of the plurality of reference signals.

15. The apparatus of claim 14, wherein the instructions to transmit the measurement report are executable by the processor to cause the apparatus to:
    transmit, in the measurement report, a first signal measurement associated with the first resource indicator and a second signal measurement associated with the second resource indicator, wherein the first resource indicator and the first reference signal correspond to a first beam of the first cell, and the second resource indicator and the second reference signal correspond to a second beam of the second cell.

16. The apparatus of claim 15, wherein the instructions to transmit the measurement report are executable by the processor to cause the apparatus to:
    transmit, in the measurement report, a third signal measurement associated with a third resource indicator and a fourth signal measurement associated with a fourth resource indicator, wherein the third resource indicator corresponds to the first cell and the fourth resource indicator corresponds to the second cell.

17. The apparatus of claim 15, wherein:
    the second signal measurement comprises a differential measurement relative to the first signal measurement; and
    the first and second resource indicators comprise one of a channel state information resource indicator or a synchronization signal block resource indicator.

18. The apparatus of claim 13, wherein the instructions are further executable by the processor to cause the apparatus to:
    receive a message indicating one or more parameters for transmission of the measurement report, wherein the one or more parameters comprises a number of signal measurements to include in the measurement report, a number of cells to include in the measurement report, a number of beams for each cell included in the measurement report, or any combination thereof.

19. The apparatus of claim 18, wherein the instructions to transmit the measurement report are executable by the processor to cause the apparatus to:
    transmit the measurement report in accordance with the one or more parameters, wherein the measurement report comprises the number of signaling measurements, the number of cells, and the number of beams for each cell.

20. The apparatus of claim 13, wherein the instructions to transmit the measurement report are executable by the processor to cause the apparatus to:
    transmit a nested index measurement report, the nested index measurement report comprising an index common to one or more other fields in the measurement report.

21. The apparatus of claim 20, wherein the index comprises the first identifier, wherein the first field is associated with the one or more other fields in the measurement report.

22. The apparatus of claim 13, wherein the instructions to perform the set of measurements of the plurality of reference signals are executable by the processor to cause the apparatus to:
    measure one or more of a reference signal received power, a signal to noise ratio, a signal to interference plus noise ratio, a reference signal strength indicator, or any combination thereof for the plurality of reference signals.

23. The apparatus of claim 13, wherein the instructions to transmit the measurement report are executable by the processor to cause the apparatus to:
    transmit a layer 1 (L1) measurement report, a channel state information report, or any combination thereof.

24. The apparatus of claim 13, wherein the first identifier comprises a first cell identifier associated with the first cell or a receive panel identifier associated with a first receive panel of the UE and the second identifier comprises a second cell identifier associated with the second cell or a second receive panel identifier associated with a second receive panel of the UE.

25. An apparatus for wireless communications at a user equipment (UE), comprising:
- means for receiving a plurality of reference signals from a plurality of cells;
- means for performing a set of measurements of the plurality of reference signals based at least in part on the receiving; and
- means for transmitting, after performing the set of measurements, a measurement report associated with both a first cell of the plurality of cells and a second cell of the plurality of cells, the measurement report comprising a first field indicating a first identifier corresponding to the first cell a second field indicating a second identifier corresponding to the second cell, a first resource indicator associated with the first identifier, and a second resource indicator associated with the second identifier.

26. The apparatus of claim 25, wherein the means for transmitting the measurement report comprise:
- means for transmitting, in the measurement report, a first resource indicator for a first reference signal of the plurality of reference signals and a second resource indicator for a second reference signal of the plurality of reference.

27. The apparatus of claim 26, wherein the means for transmitting the measurement report comprise:
- means for transmitting, in the measurement report, a first signal measurement associated with the first resource indicator and a second signal measurement associated with the second resource indicator, wherein the first resource indicator and the first reference signal correspond to a first beam of the first cell, and the second resource indicator and the second reference signal correspond to a second beam of the second cell.

28. A non-transitory computer-readable medium storing code for wireless communications at a user equipment (UE), the code comprising instructions executable by a processor to:
- receive a plurality of reference signals from a plurality of cells;
- perform a set of measurements of the plurality of reference signals based at least in part on the receiving; and
- transmit, after performing the set of measurements, a measurement report associated with both a first cell of the plurality of cells and a second cell of the plurality of cells, the measurement report comprising a first field indicating a first identifier corresponding to the first cell a second field indicating a second identifier corresponding to the second cell, a first resource indicator associated with the first identifier, and a second resource indicator associated with the second identifier.

29. The non-transitory computer-readable medium of claim 28, wherein the instructions to transmit the measurement report are executable by the processor to:
- transmit, in the measurement report, a first resource indicator for a first reference signal of the plurality of reference signals and a second resource indicator for a second reference signal of the plurality of reference signals.

30. The non-transitory computer-readable medium of claim 29, wherein the instructions to transmit the measurement report are executable by the processor to:
- transmit, in the measurement report, a first signal measurement associated with the first resource indicator and a second signal measurement associated with the second resource indicator, wherein the first resource indicator and the first reference signal correspond to a first beam of the first cell, and the second resource indicator and the second reference signal correspond to a second beam of the second cell.

* * * * *